(12) United States Patent
Kim et al.

(10) Patent No.: US 11,271,194 B2
(45) Date of Patent: Mar. 8, 2022

(54) LITHIUM SECONDARY BATTERY AND METHOD OF MANUFACTURING THE SAME

(71) Applicant: SK INNOVATION CO., LTD., Seoul (KR)

(72) Inventors: Soo Ho Kim, Daejeon (KR); Min Gu Kang, Daejeon (KR); Young Hoon Do, Daejeon (KR); Yong Hyun Cho, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 72 days.

(21) Appl. No.: 16/447,522

(22) Filed: Jun. 20, 2019

(65) Prior Publication Data

US 2019/0393479 A1    Dec. 26, 2019

(30) Foreign Application Priority Data

Jun. 20, 2018  (KR) .................. 10-2018-0070610

(51) Int. Cl.
*H01M 4/00* (2006.01)
*H01M 4/131* (2010.01)
(Continued)

(52) U.S. Cl.
CPC .......... *H01M 4/131* (2013.01); *H01M 4/366* (2013.01); *H01M 4/485* (2013.01); *H01M 4/505* (2013.01);
(Continued)

(58) Field of Classification Search
CPC .. H01M 4/131; H01M 10/0525; H01M 10/42; H01M 4/505; H01M 4/525;
(Continued)

(56) References Cited

U.S. PATENT DOCUMENTS

2014/0131616 A1†  5/2014  Sun
2015/0010824 A1†  1/2015  Sun
(Continued)

FOREIGN PATENT DOCUMENTS

KR         101407606 B1 †  6/2014
KR    10-2017-0093085        8/2017
KR       20170102293 A †  9/2017

OTHER PUBLICATIONS

Li et al. "Comparison of Single Crystal and Polycrystalline LiNi0.5Mn0.3Co0.2O2 Positive Electrode Materials for High Voltage Li-Ion Cells", 2017 J. Electrochem. Soc. 164, A1534-1544 (Year: 2017).*

*Primary Examiner* — Nicholas P D'Aniello
(74) *Attorney, Agent, or Firm* — IP & T Group LLP

(57) ABSTRACT

A lithium secondary battery includes a cathode formed from a cathode active material including a first cathode active material particle and a second cathode active material particle, an anode and a separation layer interposed between the cathode and the anode. The first cathode active material particle includes a lithium metal oxide including a concentration gradient and has a secondary particle structure formed from an assembly of primary particles. The second cathode active material particle includes a lithium metal oxide having a single particle structure. The first and second cathode active material particles each includes at least two metals except from lithium, and an amount of nickel is the largest among those of the metals in each of the first and second cathode active material particles.

14 Claims, 2 Drawing Sheets

(51) Int. Cl.
    *H01M 10/0525*     (2010.01)
    *H01M 10/42*     (2006.01)
    *H01M 4/505*     (2010.01)
    *H01M 4/525*     (2010.01)
    *H01M 4/66*     (2006.01)
    *H01M 4/485*     (2010.01)
    *H01M 4/36*     (2006.01)
    *H01M 4/62*     (2006.01)

(52) U.S. Cl.
    CPC ........... *H01M 4/525* (2013.01); *H01M 4/622* (2013.01); *H01M 4/66* (2013.01); *H01M 10/0525* (2013.01); *H01M 10/42* (2013.01); *C01P 2004/51* (2013.01); *C01P 2004/64* (2013.01)

(58) Field of Classification Search
    CPC ........ H01M 4/66; H01M 4/485; H01M 4/366; H01M 4/622; H01M 2004/028; H01M 4/364; H01M 10/052; H01M 10/058; C01P 2004/64; C01P 2004/51; Y02E 60/10
    See application file for complete search history.

(56) References Cited

U.S. PATENT DOCUMENTS

2015/0340686 A1* 11/2015 Sun ..................... C01G 53/50
    429/223
2018/0019474 A1†   1/2018 Lee
2018/0108940 A1*   4/2018 Kwon .................... H01M 4/366

\* cited by examiner
† cited by third party

LITHIUM SECONDARY BATTERY AND METHOD OF MANUFACTURING THE SAME

CROSS-REFERENCE TO RELATED APPLICATION AND CLAIM OF PRIORITY

This application claims priority to Korean Patent Applications No. 10-2018-0070610 filed on Jun. 20, 2018 in the Korean Intellectual Property Office (KIPO), the entire disclosure of which is incorporated by reference herein.

BACKGROUND

1. Field

The present invention relates to a lithium secondary battery and a method of manufacturing the same. More particularly, the present invention relates to a lithium secondary battery including a lithium metal oxide-based cathode active material and a method of manufacturing the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as an eco-friendly power source of an electric automobile such as a hybrid vehicle.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly. The lithium secondary battery may further include an outer case having, e.g., a pouch shape.

A lithium metal oxide may be used as a cathode active material of the lithium secondary battery, and high capacity, high power output and long life-span may be preferably required in the cathode active material. However, as an application of the lithium secondary battery has been expanded, stability in a harsh condition such as high temperature or low temperature may be additionally needed in the lithium secondary battery. For example, when a penetration by an external object occurs through the lithium secondary battery, thermal stability for preventing ignition or short-circuit may be needed in the lithium secondary battery or the cathode active material.

However, the cathode active material for implementing the above properties may not be easily achieved. For example, Korean Published Patent Publication No. 10-2017-0093085 discloses a cathode active material including a transition metal compound and an ion adsorbing binder, which may not provide sufficient life-span and stability.

SUMMARY

According to an aspect of the present invention, there is provided a lithium secondary battery having improved operational stability and reliability.

According to an aspect of the present invention, there is provided a method of manufacturing a lithium secondary battery having improved operational stability and reliability.

According to exemplary embodiments of the present invention, a lithium secondary battery includes a cathode formed from a cathode active material including a first cathode active material particle and a second cathode active material particle, an anode and a separation layer interposed between the cathode and the anode. The first cathode active material particle includes a lithium metal oxide including a concentration gradient and has a secondary particle structure formed from an assembly of primary particles. The second cathode active material particle includes a lithium metal oxide having a single particle structure. The first and second cathode active material particles each includes at least two metals except from lithium, and an amount of nickel is the largest among those of the metals in each of the first and second cathode active material particles.

In some embodiments, the first cathode active material particle may include a concentration gradient region between a core region and a shell region.

In some embodiments, the first cathode active material particle may have a continuous concentration gradient from a central portion to a surface.

In some embodiments, wherein the first cathode active material particle may include a lithium metal oxide represented by the following Chemical Formula 1.

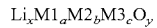  [Chemical Formula 1]

In the Chemical Formula 1 above, M1 may be Ni, and M2 and M3 may be selected from Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq2.02$, $0.6\leq a\leq0.95$, and $0.05\leq b+c\leq0.4$.

In some embodiments, $0.7\leq a\leq0.9$ and $0.1\leq b+c\leq0.3$ in the Chemical Formula 1.

In some embodiments, M2 may be manganese (Mn) and M3 may be cobalt (Co).

In some embodiments, the second cathode active material particle includes a lithium metal oxide represented by the following Chemical Formula 2.

  [Chemical Formula 2]

In the Chemical Formula 2 above, M4 may include at least one element selected from Ti, Zr, Al, Mg, Si, B or Cr, and M5 may include at least one element selected from Sr, Y, W or Mo. In the Chemical Formula 2, $0<x<1.5$, $2\leq y\leq2.02$, $0.48\leq a\leq0.52$, $0.18\leq b\leq0.22$, $0.28\leq c\leq0.32$, $0\leq d\leq0.25$, $0\leq e\leq0.15$ and $0.98\leq a+b+c\leq1.02$.

In some embodiments, $0.49\leq a\leq0.51$, $0.19\leq b\leq0.21$ and $0.29\leq c\leq0.31$ in the Chemical Formula 2.

In some embodiments, a mixing weight ratio of the first cathode active material particle and the second cathode active material particle may be in a range from 5:5 to 1:9.

In some embodiments, the second cathode active material particle may have a single crystalline structure.

In some embodiments, the second cathode active material particle may have a constant concentration from a central portion to a surface.

In some embodiments, an average diameter of the second cathode active material particle may be smaller than that of the first cathode active material particle.

In some embodiments, the number of the second cathode active material particles in a unit volume of the cathode may be greater than that of the first cathode active material particles.

In some embodiments, the second cathode active material particles may serve as pore fillers between the first cathode active material particles.

In some embodiments, an amount of Ni in the second cathode active material particle may be smaller than that in the first cathode active material particle.

In some embodiments, each of the first and second cathode active material particles may further includes cobalt (Co) and manganese (Mn). An amount of Co and an amount of Mn in the second cathode active material particle may be each greater than that in the first cathode active material particle.

According to exemplary embodiments of the present invention as described above, a blend of a first cathode active material particle and a second cathode active material particle may be used as a cathode active material. The first cathode active material particle may include a concentration gradient and may have a secondary particle structure which may be formed from an aggregation of primary particles. The second cathode active material particle may have a single particle structure or a single crystalline structure. For example, high capacity and high power of the lithium secondary battery may be obtained from the first cathode active material particle, and penetration stability and thermal stability of the lithium secondary battery may be obtained from the second cathode active material.

In some embodiments, the first and second cathode active material particles may each include a lithium metal compound having an excess amount of nickel (Ni). Thus, power output and capacity may be increased from the cathode active material while preventing ignition or explosion due to a drastic temperature increase by the second cathode active material particle having the single crystalline structure. Further, life-span and stability at high temperature of the lithium secondary battery or the cathode may be additionally improved by the concentration gradient of the first cathode active material particle.

DETAILED DESCRIPTION OF THE EMBODIMENTS

According to exemplary embodiments of the present inventive concepts, a cathode active material including a first cathode active material particle which includes a concentration gradient and has a secondary particle structure formed from an aggregation of primary particles, and a second cathode active material particle having a single particle structure is provided. According to exemplary embodiments, a lithium secondary battery including a cathode formed from the cathode active material is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first" and "second" are used herein to designate different members or elements, and not to specify or limit an order of objects or the number of elements.

Figure 1:
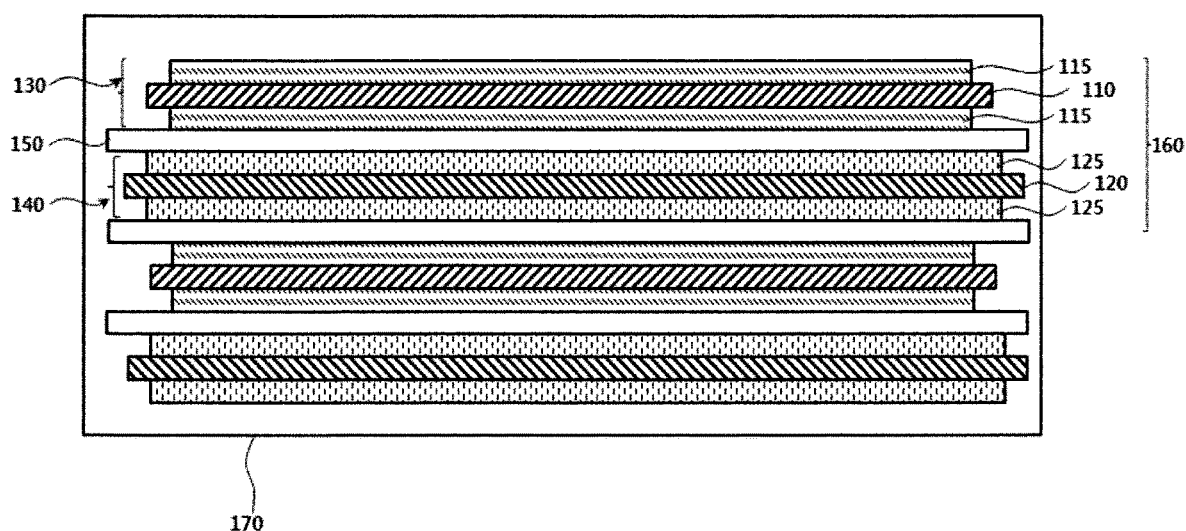
FIG. 1 is a schematic cross-sectional view illustrating a lithium secondary battery in accordance with exemplary embodiments.

FIG. 1 is a schematic cross-sectional view illustrating a lithium secondary battery in accordance with exemplary embodiments.

Referring to FIG. 1, a lithium secondary battery may include a cathode 130, and anode 140 and a separation layer 150 interposed between the cathode 130 and the anode 140.

The cathode 130 may include a cathode current collector 110 and a cathode active material layer 115 formed by coating a cathode active material on the cathode current collector 110.

In exemplary embodiments, the cathode active material may include a first cathode active material particle and a second cathode active material particle. For example, the cathode active material may be a blend of the first cathode active material particle and the second cathode active material particle.

The first cathode active material particle may include a concentration gradient therein. For example, the first cathode active material particle may include a lithium metal oxide in which at least one metal forms a concentration gradient in the particle. The lithium metal oxide may include nickel and other transition metals, and may include excess amount of nickel among metals except for lithium. The term "excess amount" used herein may indicate the largest amount or the largest molar ratio among the metals except for lithium.

In some embodiments, the first cathode active material particle may include a concentration gradient region between a central portion and a surface. For example, the first cathode material particle may include a core region and a shell region, and the concentration gradient region may be formed between the core region and the shell region. The core region and the shell region may each have a uniform or fixed concentration.

In an embodiment, the concentration gradient region may be formed at the central portion. In an embodiment, the concentration gradient region may be formed at the surface.

In some embodiments, the first cathode active material particle may include the lithium metal oxide having a continuous concentration gradient from the central portion of the particle to the surface of the particle. For example, the first cathode active material particle may have a full concentration gradient (FCG) structure having a substantially entire concentration gradient throughout the particle.

In some embodiments, concentrations of lithium and oxygen in the first cathode active material particle may be substantially fixed or constant, and at least one element except for nickel and oxygen may have a continuous concentration gradient from the central portion to the surface or in the concentration gradient region.

The term "continuous concentration gradient" used herein may indicate a concentration profile which may be changed with a uniform trend or tendency between the central portion and the surface portion. The uniform trend may include an increasing trend or a decreasing trend.

The term "central portion" used herein may include a central point of the active material particle and may also include a region within a predetermined radius from the central point. For example, "central portion" may encompass a region within a radius of about 0.1 μm from the central point of the active material particle.

The term "surface" or "surface portion" used herein may include an outermost surface of the active material particle, and may also include a predetermined thickness from the outermost surface. For example, "surface" or "surface portion" may include a region within a thickness of about 0.1 μm from the outermost surface of the active material particle.

In some embodiments, the continuous concentration particle may include a linear concentration profile or a curved concentration profile. In the curved concentration profile, the concentration may change in a uniform trend without any inflection point.

In an embodiment, at least one metal except for lithium included in the first cathode active material particle may have an increasing continuous concentration gradient, and at least one metal except for lithium included in the first cathode active material particle may have a decreasing continuous concentration gradient.

In an embodiment, at least one metal included in the first cathode active material particle except for lithium may have a substantially constant concentration from the central portion to the surface.

In an embodiment, metals included in the first cathode active material particle except for lithium may include a first metal M1 and a second metal M2. The first metal M1 may have a continuously decreasing concentration gradient from the central portion to the surface or in the concentration gradient region. The second metal M2 have a continuously increasing concentration gradient from the central portion to the surface or in the concentration gradient region.

In an embodiment, the metals included in the first cathode active material particle except for lithium may further include a third metal M3. The third metal M3 may have a substantially constant concentration from the central portion to the surface.

The term "concentration" used herein may indicate, e.g., a molar ratio of the first to third metals.

For example, the first cathode active material particle may include a lithium metal oxide represented by the following Chemical Formula 1.

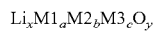
[Chemical Formula 1]

In the Chemical Formula 1 above, M1, M2 and M3 may be selected from Ni, Co, Mn, Na, Mg, Ca, Ti, V, Cr, Cu, Zn, Ge, Sr, Ag, Ba, Zr, Nb, Mo, Al, Ga and B, and $0<x\leq1.1$, $2\leq y\leq2.02$, $0<a<1$, $0<b<1$, $0<c<1$, and $0<a+b+c\leq1$.

In some embodiments, M1, M2 and M3 may be nickel (Ni), manganese (Mn) and cobalt (Co), respectively.

For example, nickel (Ni) may serve as a metal related to a capacity of the lithium secondary battery. As an amount of nickel becomes higher, capacity and power output of the lithium secondary battery may be improved. However, an excessive amount of nickel may degrade of a life-span of the battery, and may be disadvantageous in an aspect of mechanical and electrical stability of the battery. For example, when the amount of nickel is excessively increased, defects such as ignition or short-circuit by a penetration of an external object may not be sufficiently suppressed.

However, according to exemplary embodiments, nickel may be included as the first metal M1. Thus, the amount of nickel at the central portion may be relatively high to improve the capacity and power output of the lithium secondary battery, and a concentration of nickel may be decreased from the central portion to the surface to prevent the defects from the penetration and a life-span reduction.

For example, manganese (Mn) may serve as a metal related to the mechanical and electrical stability of the lithium secondary battery. In exemplary embodiments, an amount of Mn may be increased from the central portion to the surface so that the defects from the penetration such as ignition or short-circuit through the surface may be suppressed or reduced, and the life-span of the lithium secondary battery may be also enhanced.

For example, cobalt (Co) may serve as a metal related to a conductivity or a resistance of the lithium secondary battery. In exemplary embodiments, a concentration of cobalt may be substantially fixed or uniformly maintained through an entire region of the first cathode active material particle. Thus, a current or a charge flow through the first cathode active material particle may be uniformly maintained while improving the conductivity of the battery and maintaining low resistance.

In some embodiments, in Chemical Formula 1, the first metal M1 may be nickel, and, e.g., $0.6\leq a\leq0.95$ and $0.05\leq b+c\leq0.4$. For example, a concentration (or a molar ratio) of nickel may be continuously decreased from about 0.95 to about 0.6.

If a lower limit of the nickel concentration (e.g., a surface concentration) is less than about 0.6, capacity and power output at the surface of the first cathode active material particle may be excessively deteriorated. If an upper limit of the nickel concentration (e.g., a central concentration) exceeds about 0.95, life-span and mechanical stability at the central portion may be excessively degraded.

Preferably, in a consideration of capacity and stability properties, $0.7\leq a\leq0.9$ and $0.1\leq b+c\leq0.3$.

In an embodiment, an average concentration ratio Ni:Co:Mn throughout the first cathode active material particle may be adjusted as about 8:1:1. In this case, capacity and power output of the battery may be enhanced through Ni having a molar ratio of about 0.8, and conductivity and life-span of the battery may be improved via Co and Mn having substantially the same amount.

In some embodiments, the first cathode active material particle may further include a coating on a surface thereof. For example, the coating may include Al, Ti, Ba, Zr, Si, B, Mg, P, an alloy thereof or on oxide thereof. These may be used alone or in a combination thereof. The first cathode active material particle may be passivated by the coating so that penetration stability and life-span of the battery may be further improved.

In an embodiment, the elements, the alloy or the oxide of the coating may be inserted in the first cathode active material particle as dopants.

In some embodiments, the first cathode active material particle may be formed from a primary particle having a rod-type shape. An average diameter of the first cathode active material particle (e.g., an average diameter of a secondary particle) may be in a range from about 3 μm to about 25 μm, preferably from about 7 μm to about 15 μm.

As described above, the lithium metal oxide having an excess amount of Ni may be used as the first cathode active material particle to achieve high capacity/power output properties. Further, the concentration gradient may be included in the first cathode active material particle so that reduction of life-span and operational stability due to the excess amount of Ni may be prevented.

In exemplary embodiments, the first cathode active material particle may have a secondary particle shape formed from aggregation or assembly of the primary particles. For example, the concentration gradient of the first cathode active material particle may be created by a co-precipitation method while changing concentrations of metal precursors as described below. Accordingly, concentrations of the primary particles may be changed while being precipitated and aggregated so that the secondary particle having the concentration gradient throughout an entire particle may be obtained.

Thus, the structure of the first cathode active material particle including the concentration gradient may be easily achieved.

In exemplary embodiments, the second cathode active material particle may have a single crystalline structure. The term "single crystalline structure" used herein may indicate that the second cathode active material particle is a single particle or consists of a single particle.

For example, the second cathode active material particle may substantially consist of primary particles, and a secondary particle structure formed from aggregation or assembly of the primary particles may be excluded. In some embodiments, the second cathode active material particle may include a structure in which a plurality of the primary particles may be integrally merged and converted into a substantially single particle.

As described above, the first cathode active material particle may have the secondary particle structure for easily forming the concentration gradient. The secondary particle structure may include a plurality of primary particles therein, and thus cracks may be easily propagated through the particle when a penetration of the battery occurs by the external object. Accordingly, heat generation or heat propagation may be drastically accelerated in a short period due to an excess current when short-circuit between electrodes occurs by the penetration.

Further, when the cathode active material is coated on the cathode current collector 110 and pressed for forming the cathode 130, pressure may be transferred through pores between the primary particles in the first cathode active material particle to cause cracks and fractures of the first cathode active material particle. In this case, desired capacity and power output may not be obtained.

However, the second cathode active material particle may be used together with the first cathode active material particle so that heat and shock propagation through cracks in the cathode active material particle may be reduced or prevented. Thus, life-span and long-term operational reliability of the lithium secondary battery may be improved. Further, drastic heat generation when the penetration occurs may be blocked to prevent ignition or explosion of the battery.

In example embodiments, the second cathode active material particle may have a substantially constant or fixed concentration throughout an entire region of the particle. The second cathode active material particle may include a lithium metal oxide.

In exemplary embodiments, the second cathode active material particle may include a nickel-containing lithium metal oxide. In the second cathode active material particle, a concentration of nickel may be less than that in the first cathode active material particle. In an embodiment, the concentration of nickel in the second cathode active material particle may be fixed to be less than the concentration of nickel at the surface of the first cathode active material particle.

In some embodiments, the second cathode active material particle may include at least two metals except for lithium. Concentrations of the metals except for lithium may be substantially uniform or constant from a central portion of the particle to a surface of the particle.

In some embodiments, the second cathode active material particle may include nickel (Ni), cobalt (Co) and manganese (Mn). As described above, concentrations or molar ratios of Ni, Co and Mn may be substantially uniform or constant throughout the entire region of the second cathode active material particle.

In some embodiments, the second cathode active material particle may include an excess amount of nickel, and the concentrations of nickel, manganese and cobalt may become sequentially smaller in consideration of both capacity and stability of the lithium secondary battery. In a preferable embodiment, the concentration ratio of Ni:Co:Mn in the second cathode active material particle may be substantially about 5:2:3.

As described above, the second cathode active material particle may also include an excess amount of Ni, and may have a nickel concentration or a nickel molar ratio less than that of the first cathode active material particle. Thermal stability and life-span of the lithium secondary battery may be effectively added via a combination of the composition and the single particle structure of the second cathode active material particle.

For example, the second cathode active material particle may include a lithium metal oxide represented by the following Chemical Formula 2.

$$Li_xNi_aCo_bMn_cM4_dM5_eO_y \qquad \text{[Chemical Formula 2]}$$

In the Chemical Formula 2 above, M4 may include at least one element selected from Ti, Zr, Al, Mg, Si, B or Cr. M5 may include at least one element selected from Sr, Y, W or Mo. In Chemical Formula 2, $0<x<1.5$, $2\le y\le2.02$, $0.48\le a\le0.52$, $0.18\le b\le0.22$, $0.28\le c\le0.32$, $0\le d\le0.25$, $0\le e\le0.15$ and $0.98\le a+b+c\le1.02$. Preferably, $0.49\le a\le0.51$, $0.19\le b\le0.21$ and $0.29\le c\le0.31$.

In some embodiments, an average diameter ($D_{50}$) of the second cathode active material particle may be in a range from about 2 μm to about 15 μm. Within this range, life-span and stability of the lithium secondary battery or the cathode 130 may be improved without hindering an electrical activity of the first cathode active material particle by the second cathode active material particle.

In an embodiment, the average diameter ($D_{50}$) of the second cathode active material particle may be in a range from about 1 μm to about 10 μm, preferably from about 1 μm to about 8 μm, more preferably from about 2 μm to about 7 μm.

In exemplary embodiments, the average diameter of the second cathode active material particle may be less than that of the first cathode active material particle. For example, the average diameter of the first cathode active material particle may be in a range from about 7 μm to about 15 μm, and the average diameter of the second cathode active material particle may be in a range from about 2 μm to about 7 μm.

Accordingly, the second cathode active material particle may serve as a pore filler. Thus, propagation of heat or cracks due to penetration or pressing may be avoided or reduced by the second cathode active material particle. Additionally, heat diffusion in the first cathode active material particle when the penetration occurs may be blocked by the second cathode active material particle.

Spaces between the first cathode active material particles may be filled with the second cathode active material particles having a relatively small average diameter so that an electrode density of the cathode active material layer 115 and an amount of the cathode active material particles may be increased relatively to an amount of a binder. Thus, capacity and power output from the cathode may be increased while enhancing thermal and mechanical stability.

In exemplary embodiments, the number of the second cathode active material particles per unit volume of the cathode active material layer 115 may be greater than that of the first cathode active material particles.

The first cathode active material particles and the second cathode active material particles may be each prepared and blended to obtain the cathode active material. A mixing weight ratio of the first cathode active material particle and the second cathode active material particle may be from about 6:4 to about 1:9, preferably from about 5:5 to about 1:9. Within this range, improvement of thermal stability and life-span and prevention of ignition due to penetration may be easily implemented by the second cathode active material particles.

As described above, the first cathode active material particle may be prepared by the co-precipitation method. For example, metal precursor solutions having different concentrations may be prepared. The metal precursor solutions may include precursors of metals that may be included in the cathode active material. For example, the metal precursors may include halides, hydroxides, acid salts, etc., of the metals.

For example, the metal precursors may include a nickel precursor, a manganese precursor and a cobalt precursor.

In exemplary embodiments, a first precursor solution having a target composition at the central portion (e.g., concentrations of nickel, manganese and cobalt at the central portion) of the first cathode active material particle and a second precursor solution having a target composition at the surface or the surface portion (e.g., concentrations of nickel, manganese and cobalt at the surface) of the first cathode active material particle may be each prepared.

Subsequently, the first and second precursor solutions may be mixed and precipitates may be formed. In some embodiments, a mixing ratio may be continuously changed so that a continuous concentration gradient may be formed from the target composition at the central portion to the target composition at the surface. Accordingly, the precipitate may include a concentration gradient of the metals therein.

In some embodiments, a chelate agent and a basic agent (e.g., an alkaline agent) may be added while forming the precipitate. In some embodiments, the precipitate may be thermally treated, and then a lithium salt may be mixed and thermally treated again.

In some embodiments, the first cathode active material particle may be prepared by a solid state mixing/reaction, and the preparation method may not be limited to a solution-based process as described above.

In exemplary embodiments, the second cathode active material particle may be prepared by a solid state thermal treatment of metal precursors.

For example, a lithium precursor (e.g., a lithium salt), the nickel precursor, the manganese precursor and the cobalt precursor may be mixed according to the composition of the Chemical Formula 2 above to form a precursor powder.

The precursor powder may be thermally treated in a furnace at, e.g., a temperature from about 700° C. to about 1200° C., and the precursors may be merged or fused into a substantially single particle shape to obtain the second cathode active material particle having a single crystalline structure. The thermal treatment may be performed under an air atmosphere or an oxygen atmosphere so that the second cathode active material particle may be formed as a lithium metal oxide particle.

Within the above temperature range, generation of secondary particles may be substantially suppressed, and the second cathode active material particle without defects therein may be achieved. Preferably, the thermal treatment may be performed at a temperature from about 800° C. to about 1000° C.

The first cathode active material particle and the second cathode active material particle may be blended to form the cathode active material. The cathode active material may be mixed and stirred together with a binder, a conductive agent and/or a dispersive additive in a solvent to form a slurry. The slurry may be coated on the cathode current collector 110, and pressed and dried to obtain the cathode 130.

During the pressing process, mechanical stability of the cathode active material may be maintained by the second cathode active material particle.

The cathode current collector 110 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 115, and an amount of the first and second cathode active material particles may be relatively increased. Thus, capacity and power output of the lithium secondary battery may be further improved.

The conductive agent may be added to facilitate electron mobility between the active material particles. For example, the conductive agent may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

In some embodiments, an electrode density of the cathode 130 may be in a range from about 3.0 g/cc to about 3.9 g/cc, preferably, from 3.2 g/cc to about 3.8 g/cc.

In exemplary embodiments, the anode 140 may include an anode current collector 120 and an anode active material layer 125 formed by coating an anode active material on the anode current collector 120.

The anode active material may include a material that may be capable of adsorbing and ejecting lithium ions. For example, a carbon-based material such as a crystalline carbon, an amorphous carbon, a carbon complex or a carbon fiber, a lithium alloy, silicon, tin, etc., may be used. The amorphous carbon may include a hard carbon, cokes, a mesocarbon microbead (MCMB) calcinated at a temperature of 1,500° C. or less, a mesophase pitch-based carbon fiber (MPCF), etc. The crystalline carbon may include a graphite-based material, such as natural graphite, graphitized cokes, graphitized MCMB, graphitized MPCF, etc. The lithium alloy may further include aluminum, zinc, bismuth, cadmium, antimony, silicon, lead, tin, gallium, or indium.

The anode current collector 120 may include gold, stainless-steel, nickel, aluminum, titanium, copper or an alloy thereof, preferably, may include copper or a copper alloy.

In some embodiments, the anode active material may be mixed and stirred together with a binder, a conductive agent and/or a dispersive additive in a solvent to form a slurry. The slurry may be coated on the anode current collector 120, and pressed and dried to obtain the anode 140.

The binder and the conductive agent substantially the same as or similar to those as mentioned above may be used. In some embodiments, the binder for the anode 140 may include an aqueous binder such as such as styrene-butadiene rubber (SBR) that may be used with a thickener such as carboxymethyl cellulose (CMC) so that compatibility with the carbon-based active material may be improved.

The separation layer 150 may be interposed between the cathode 130 and the anode 140. The separation layer 150 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 150 may be also formed from a non-woven fabric including a glass fiber with a high melting point, a polyethylene terephthalate fiber, or the like.

In some embodiments, an area and/or a volume of the anode 140 (e.g., a contact area with the separation layer 150) may be greater than that of the cathode 130. Thus, lithium ions generated from the cathode 130 may be easily transferred to the anode 140 without loss by, e.g., precipitation or sedimentation. Therefore, the enhancement of power and stability by the combination of the first and second cathode active material particles may be effectively implemented.

In exemplary embodiments, an electrode cell 160 may be defined by the cathode 130, the anode 140 and the separation layer 150, and a plurality of the electrode cells 160 may be stacked to form an electrode assembly having, e.g., a jelly roll shape. For example, the electrode assembly may be formed by winding, laminating or folding of the separation layer 150.

The electrode assembly may be accommodated in an outer case 170 together with an electrolyte to form the lithium secondary battery. In exemplary embodiments, the electrolyte may include a non-aqueous electrolyte solution.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

An electrode tab may be formed from each of the cathode current collector 110 and the anode current collector 120 to extend to one end of the outer case 170. The electrode tabs may be welded together with the one end of the outer case 170 to form an electrode lead exposed at an outside of the outer case 170.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims Examples (1) Preparation of First Cathode Active Material Particle A total target composition was $Li_{1.0}Ni_{0.8}Co_{0.1}Mn_{0.1}O_2$, a target composition at a core region was $LiNi_{0.84}2Co_{0.11}Mn_{0.05}O_2$, and a target composition at a shell region was $Li_{1.0}Ni_{0.78}Co_{0.10}Mn_{0.12}O_2$. A concentration gradient region (decreasing Ni concentration and increasing Mn concentration) was formed between the core region and the shell region by continuously changing a mixing ratio of Ni and Mn precursors to form precipitates and obtain the first cathode active material particle (hereinafter, abbreviated as NCM811).

Figure 2:
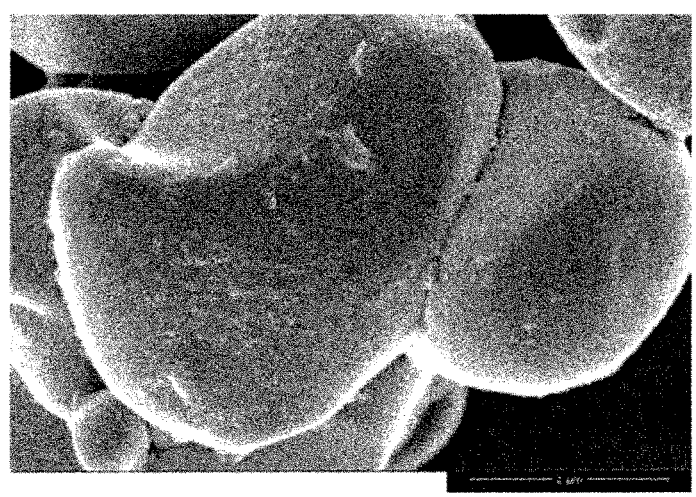
FIG. 2 is a surface SEM (Scanning Electron Microscope) image of a second cathode active material particle prepared by Example.
Figure 3:
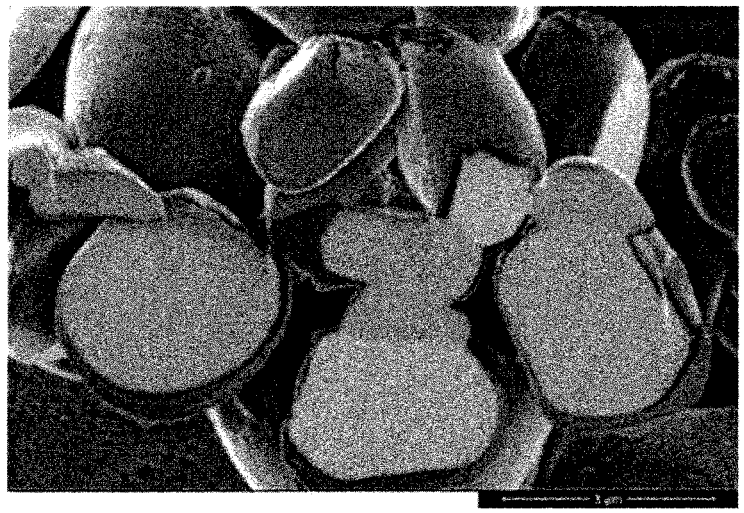
FIG. 3 is a cross-sectional SEM (Scanning Electron Microscope) image of a second cathode active material particle prepared by Example.

(2) Preparation of Second Cathode Active Material Particle $Ni_{0.5}Co_{0.2}Mn_{0.3}(OH)_2$ as an NCM precursor, and $Li_2CO_3$ and LiOH as lithium sources were grinded and mixed for 20 minutes. The mixed power was fired at 1000° C. for 15 hours, and then grinding, sieving and de-ironing processes were performed to obtain $LiNi_{0.5}Co_{0.2}Mn_{0.3}O_2$ (hereinafter, abbreviated as single crystalline NCM523) of a single crystalline type (see FIGS. 2 and 3).

(3) Fabrication of Secondary Battery

Blending ratios of the first and second cathode active material particles were adjusted as listed in following Table 1 to form cathode active materials. Denka Black was used as a conductive agent, and PVDF was used as a binder. The cathode active material, the conductive agent and the binder were mixed by a weight ratio of 92:5:3 to form a cathode mixture. The cathode mixture was coated, dried, and pressed on an aluminum substrate to form a cathode. A density of the cathode after the pressing was 3.5 g/cc or more.

An anode slurry was prepared by mixing 93 wt % of a natural graphite as an anode active material, 5 wt % of a flake type conductive agent KS6, 1 wt % of SBR as a binder, and 1 wt % of CMC as a thickener. The anode slurry was coated, dried, and pressed on a copper substrate to form an anode.

The cathode and the anode obtained as described above were notched with a proper size and stacked, and a separator (polyethylene, thickness: 25 μm) was interposed between the cathode and the anode to form an electrode cell. Each tab portion of the cathode and the anode was welded. The welded cathode/separator/anode assembly was inserted in a pouch, and three sides of the pouch (e.g., except for an electrolyte injection side) were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving 1M $LiPF_6$ in a mixed solvent of EC/EMC/DEC (25/45/30; volume ratio), and then 1 wt % of vinylene carbonate, 0.5 wt % of 1,3-propensultone (PRS), and 0.5 wt % of lithium bis (oxalato) borate (LiBOB) were added.

Comparative Examples $Ni_{0.5}Co_{0.2}Mn_{0.3}(OH)_2$ and $Li_2CO_3$ were mixed in a solid state to prepare $LiNi_{0.5}Co_{0.2}Mn_{0.3}O_2$ which had a secondary particle structure formed from an aggregation of primary particles (hereinafter, abbreviated as a multi-crystalline NCM523) as a second cathode active material particle.

Secondary batteries of Comparative Examples were fabricated by the same method as that of Examples except that the multi-crystalline NCM523 was used as the second cathode active material particle and cathode active materials having weight ratios as listed in Table 1 below were used.

Experimental Example (1) Evaluation on Life-Span Property at Room Temperature 500 cycles of a charging (CC-CV 1.0 C 4.2V 0.05C CUT-OFF) and a discharging (CC 1.0C 2.7V CUT-OFF) were repeated using the secondary batteries of Examples and Comparative Examples. A life-span property was measured by a percentage (%) of a discharging capacity at a 500th cycle with respect to that at a first cycle.

(2) Evaluation on Penetration Stability

Secondary batteries of Examples and Comparative Examples were charged 1C 4.2V 0.1C CUT-OFF), and then penetrated from an outside of the batteries by a nail having a diameter of 3 mm at a rate of 80 mm/sec. A penetration stability was evaluated based on a standard below.

<Penetration Stability, EUCAR Hazard Level>
L1: No malfunction occurs from the battery
L2: Irreversible damages of the battery occur
L3: A weight of an electrolyte in the battery was decreased by a ratio less than 50%
L4: A weight of an electrolyte in the battery was decreased by a ratio of 50% or more
L5: Ignition or explosion occurs The results are shown in Table 1 below.

TABLE 1

| | First Cathode Active Material Particle | Second Cathode Active Material Particle (D50: 7 μm) | Mixing Weight Ratio | Life-span (%) (500cycle) | Penetration Stability |
|---|---|---|---|---|---|
| Example 1 | NCM811 | single crystalline NCM523 | 90:10 | 90.1% | L5 |
| Example 2 | NCM811 | single crystalline NCM523 | 80:20 | 90.9% | L4 |
| Example 3 | NCM811 | single crystalline NCM523 | 70:30 | 92.8% | L3 |
| Example 4 | NCM811 | single crystalline NCM523 | 60:40 | 94.1% | L3 |
| Example 5 | NCM811 | single crystalline NCM523 | 50:50 | 95.3% | L3 |
| Example 6 | NCM811 | single crystalline NCM523 | 40:60 | 96.1% | L3 |
| Example 7 | NCM811 | single crystalline NCM523 | 30:70 | 97.6% | L3 |
| Example 8 | NCM811 | single crystalline NCM523 | 20:80 | 99.3% | L3 |
| Example 9 | NCM811 | single crystalline NCM523 | 10:90 | 99.5% | L3 |
| Comparative Example 1 | NCM811 | multi crystalline NCM523 | 90:10 | 85.8% | L5 |
| Comparative Example 2 | NCM811 | multi crystalline NCM523 | 80:20 | 87.1% | L5 |
| Comparative Example 3 | NCM811 | multi crystalline NCM523 | 70:30 | 88.6% | L5 |
| Comparative Example 4 | NCM811 | multi crystalline NCM523 | 60:40 | 89.7% | L5 |
| Comparative Example 5 | NCM811 | multi crystalline NCM523 | 50:50 | 90.7% | L4 |
| Comparative Example 6 | NCM811 | multi crystalline NCM523 | 40:60 | 92.3% | L4 |
| Comparative Example 7 | NCM811 | multi crystalline NCM523 | 30:70 | 93.5% | L3 |
| Comparative Example 8 | NCM811 | multi crystalline NCM523 | 20:80 | 94.7% | L3 |
| Comparative Example 9 | NCM811 | multi crystalline NCM523 | 10:90 | 98.1% | L3 |
| Comparative Example 10 | NCM811 | multi crystalline NCM523 | — | 98.2% | L3 |

Referring to Table 1 above, the batteries of Examples using the single crystalline NCM523 together with NCM811 having a concentration gradient showed improved life-span and penetration stability compared to the batteries of Comparative Examples using the multi crystalline NCM523. The batteries of Examples 5-9 including 50% or more of the single crystalline NCM523 showed life-span retentions of 95% or more, and more improved penetration stability.

(3) Evaluation on DSC

Heating values according to a temperature change of the cathode active material particle in Examples (the single crystalline NCM523) and the cathode active material particle in Comparative Examples (the multi crystalline NCM523) were measured using a DSC (Differential Scanning Calorimetry) method to evaluate thermal properties of the second cathode active material particles.

Figure 4:
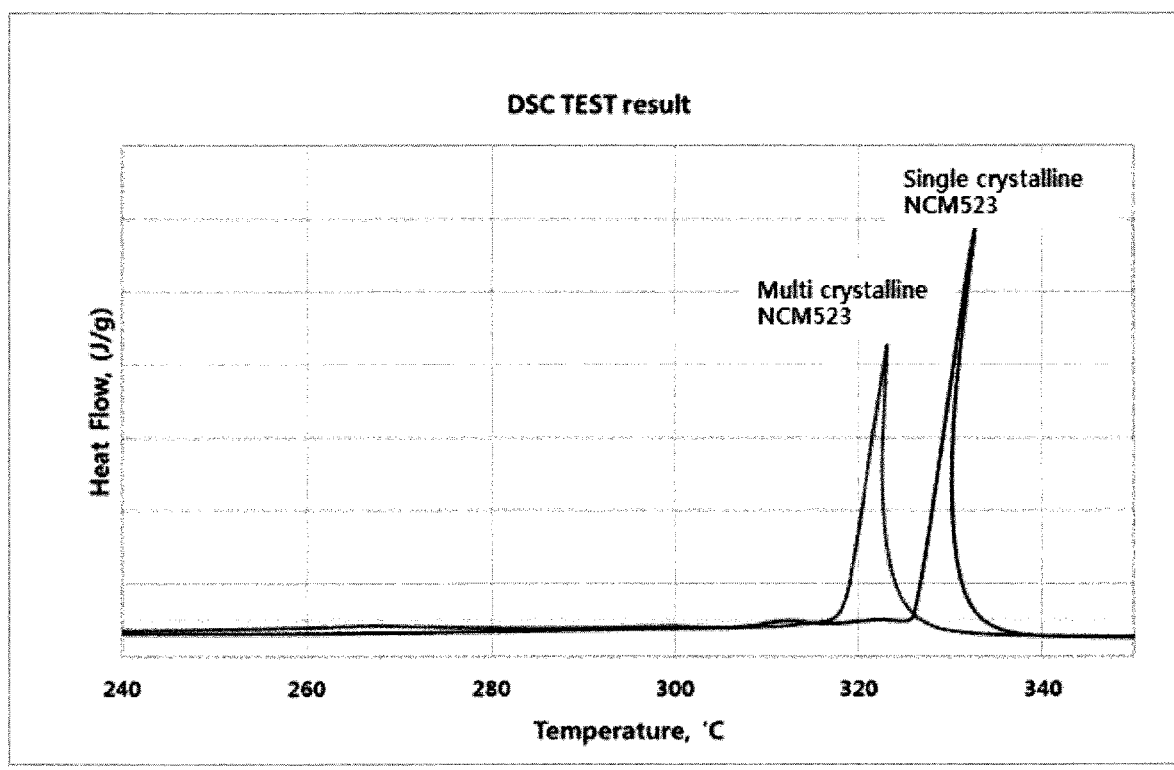
FIG. 4 is a Differential Scanning Calorimetry (DSC) graph of second cathode active material particles prepared by Example and Comparative Example.

FIG. 4 is a Differential Scanning Calorimetry (DSC) graph of second cathode active material particles prepared by Example and Comparative Example.

Referring to FIG. 4, a heating peak occurred at a temperature greater than 330° C. in the cathode active material particle of Example. A heating peak occurred at a temperature greater than 320° C. in the cathode active material particle of Comparative Example.

(4) Overcharging Test

The secondary batteries of Example 8 and Comparative Example 8 including the first cathode active material particle and the second cathode active material particle by a mixing ratio of 20:80 were charged from a state of SOC 0% to a state of SOC 100% by a charging current 6V for 2.5 hours, and thermal stability was evaluated using EUCAR Hazard Level standard.

After the test above, the secondary battery of Example 8 was not ignited (L3 level). However, a weight of the electrolyte in the secondary battery of Comparative Example 8 was drastically decreased to L4 level.

What is claimed is:

1. A lithium secondary battery, comprising:
a cathode formed from a cathode active material including a plurality of first cathode active material particles and a plurality of second cathode active material particles;
an anode; and
a separation layer interposed between the cathode and the anode,
wherein the first cathode active material particles include a lithium metal oxide including a concentration gradient region and has a secondary particle structure formed from an assembly of primary particles,
wherein the second cathode active material particles include a lithium metal oxide having a single crystalline particle structure from which a secondary particle formed from aggregation or assembly of primary particles is excluded,
wherein the first and second cathode active material particles each includes nickel, cobalt and manganese, and an amount of nickel is the largest among nickel, cobalt and manganese in each of the first and second cathode active material particles,
wherein a concentration of nickel in the first cathode active material particles decreases in the concentration gradient region in a direction from a center to a surface of each particle, and a surface concentration of nickel among nickel, cobalt and manganese in the first cathode active material particles is 0.6 to 0.95,
wherein a mixing weight ratio of the first cathode active material particles and the second cathode active material particles is in a range from 5:5 to 1:9.

2. The lithium secondary battery according to claim 1, wherein the first cathode active material particles include the continuous concentration gradient region between a core region and a shell region.

3. The lithium secondary battery according to claim 1, wherein the first cathode active material particles have a continuous concentration gradient region from a central portion to a surface.

4. The lithium secondary battery according to claim 1, wherein the first cathode active material particles include a lithium metal oxide represented by the following Chemical Formula 1:

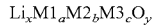   [Chemical Formula 1]

wherein, in the Chemical Formula 1 above, M1 is Ni, and M2 and M3 are selected from Co and Mn, and $0<x\leq1.1$, $2\leq y\leq2.02$, $0.6\leq a\leq0.95$, and $0.05\leq b+c\leq0.4$.

5. The lithium secondary battery according to claim 4, wherein, $0.7\leq a\leq0.9$ and $0.1\leq b+c\leq0.3$ in the Chemical Formula 1.

6. The lithium secondary battery according to claim 1, wherein the second cathode active material particles include a lithium metal oxide represented by the following Chemical Formula 2:

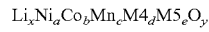   [Chemical Formula 2]

wherein, in the Chemical Formula 2 above, M4 includes at least one element selected from Ti, Zr, Al, Mg, Si, B or Cr, and M5 includes at least one element selected from Sr, Y, W or Mo,
wherein, in the Chemical Formula 2, $0<x<1.5$, $2\leq y\leq2.02$, $0.48\leq a\leq0.52$, $0.18\leq b\leq0.22$, $0.28\leq c\leq0.32$, $0\leq d\leq0.25$, $0\leq e\leq0.15$ and $0.98\leq a+b+c\leq1.02$.

7. The lithium secondary battery according to claim 6, wherein $0.49\leq a\leq0.51$, $0.19\leq b\leq0.21$ and $0.29\leq c\leq0.31$ in the Chemical Formula 2.

8. The lithium secondary battery according to claim 1, wherein the second cathode active material particles have a constant concentration from a central portion to a surface.

9. The lithium secondary battery according to claim 1, wherein an average diameter of the second cathode active material particles is smaller than that of the first cathode active material particles.

10. The lithium secondary battery according to claim 9, wherein the number of the second cathode active material particles in a unit volume of the cathode is greater than that of the first cathode active material particles.

11. The lithium secondary battery according to claim 9, wherein the second cathode active material particles serve as pore fillers between the first cathode active material particles.

12. The lithium secondary battery according to claim 1, wherein an amount of Ni in the second cathode active material particles is smaller than that in the first cathode active material particles.

13. The lithium secondary battery according to claim 1, wherein each of the first and second cathode active material particles further includes cobalt (Co) and manganese (Mn), wherein an amount of Co and an amount of Mn in the second cathode active material particles is greater than that in the first cathode active material particles.

14. The lithium secondary battery according to claim 4, wherein the first cathode active material particles further include a coating on a surface thereof, wherein the coating includes at least one selected from Al, Ti, Ba, Zr, Si, B, Mg, P, an alloy thereof or an oxide thereof.

* * * * *